United States Patent [19]
Koller

[11] Patent Number: 5,947,246
[45] Date of Patent: Sep. 7, 1999

[54] OVERLOAD CLUTCH AND DETECTOR PLATE ASSEMBLY

[75] Inventor: Frank H. Koller, Norridge, Ill.

[73] Assignee: Emerson Electric Company, St. Louis, Mich.

[21] Appl. No.: 09/118,163

[22] Filed: Jul. 16, 1998

[51] Int. Cl.[6] .................................................. F16D 7/00
[52] U.S. Cl. ...................... 192/56.1; 192/30 W
[58] Field of Search .................... 192/56.1, 150, 192/30 W; 324/207.2, 207.22, 207.24, 207.26, 251; 477/178

[56] References Cited

U.S. PATENT DOCUMENTS

| | | |
|---|---|---|
| 3,282,387 | 11/1966 | Becker et al. . |
| 3,546,897 | 12/1970 | Kenny . |
| 3,893,553 | 7/1975 | Hansen .............................. 192/30 W X |
| 3,924,421 | 12/1975 | Dehne et al. . |
| 3,930,382 | 1/1976 | Timtner .................... 192/150 |
| 4,746,320 | 5/1988 | Kilwin ................. 192/150 X |
| 5,067,600 | 11/1991 | Koller . |

OTHER PUBLICATIONS

Spirolox Retaining Rings (Kaydon Ring and Seal Inc.) brochure, cover page and pp. 9 and 40.
"Autogard" Torque Limiters overload clutch brochure, cover and miscellaneous pages.
Trig–O–Matic (Centric) brochure.
"Trig–O–Matic Lite", Centric clutch overload clutch brochure (revised Dec., 1995).
Camco Accessories (Commercial Cam Co., Inc.) brochure with pertinent pages re "Torq Gard" overload clutches and overload output clutches.

*Primary Examiner*—Rodney H. Bonck
*Attorney, Agent, or Firm*—Tilton, Fallon, Lungmus & Chestnut

[57] ABSTRACT

A detector plate for an overload clutch, the detector plate having at its peripheral edge a flat metal spiral retaining ring for providing improved detection by an adjacent proximity switch device. The spiral retaining ring provides an appropriate metal motion detection surface, for the customary plastic detector plate, any movement of which can be detected by the proximity switch. As an alternate embodiment, a metal surface coating can be formed onto the plastic detector plate to permit proximity switch detection of any movement of the detector plate.

13 Claims, 4 Drawing Sheets

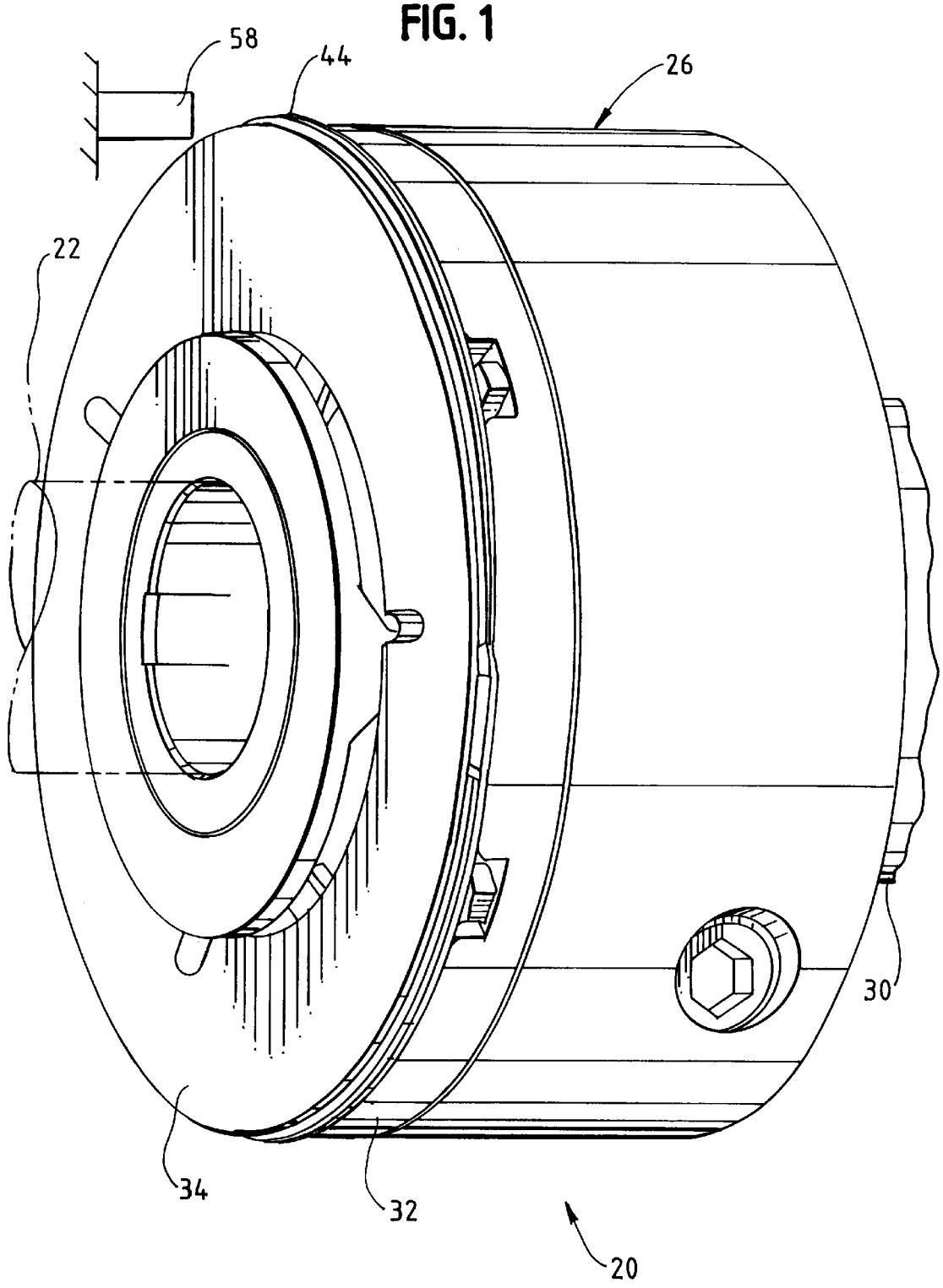

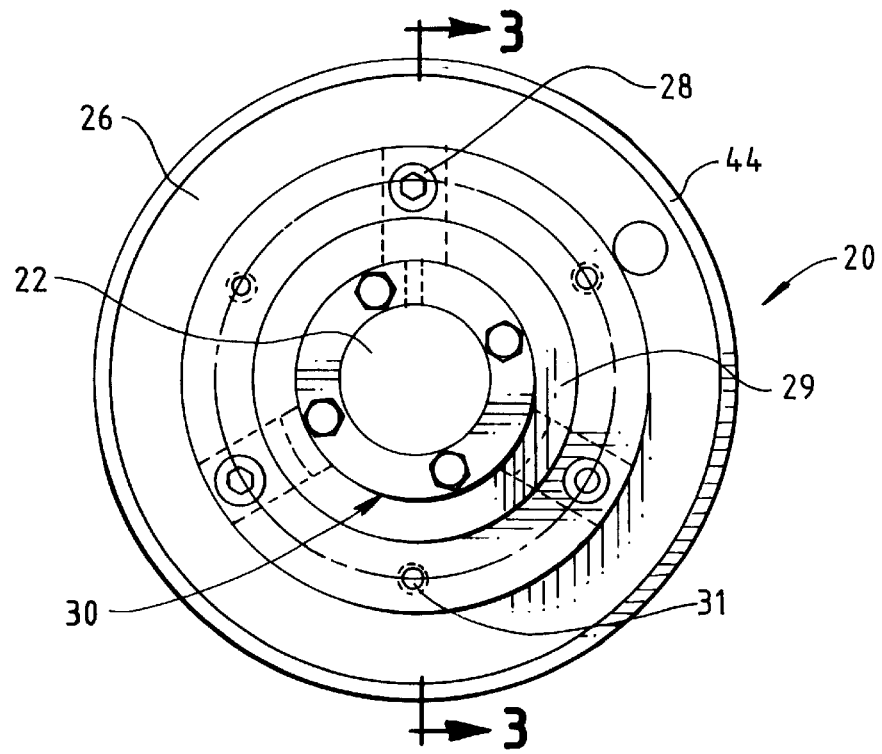
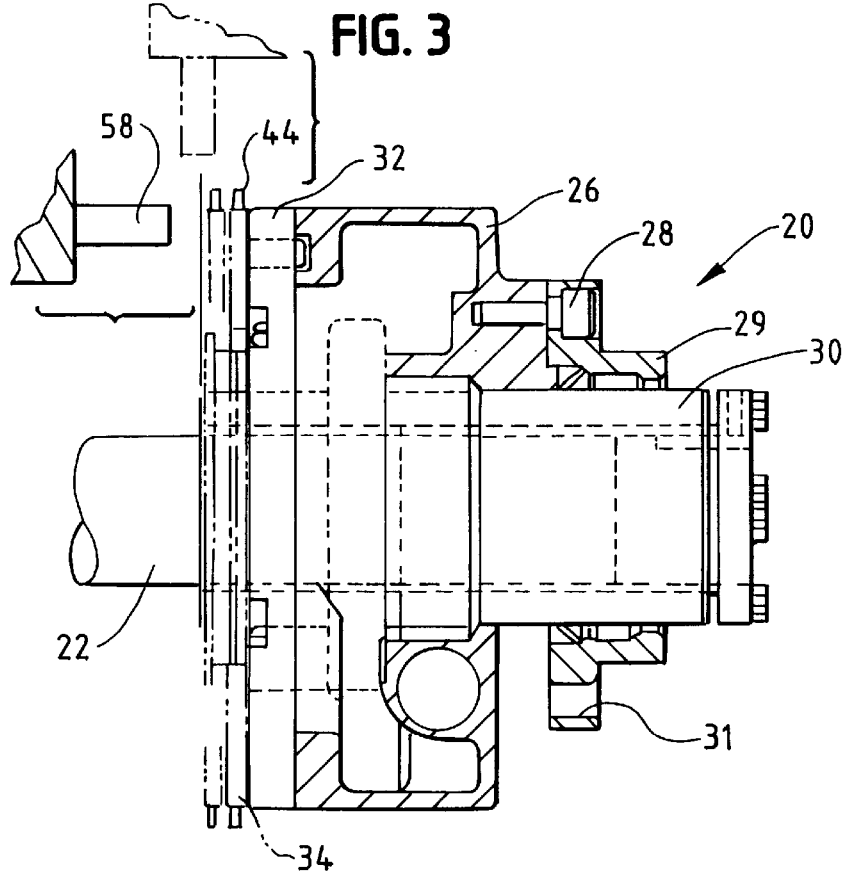

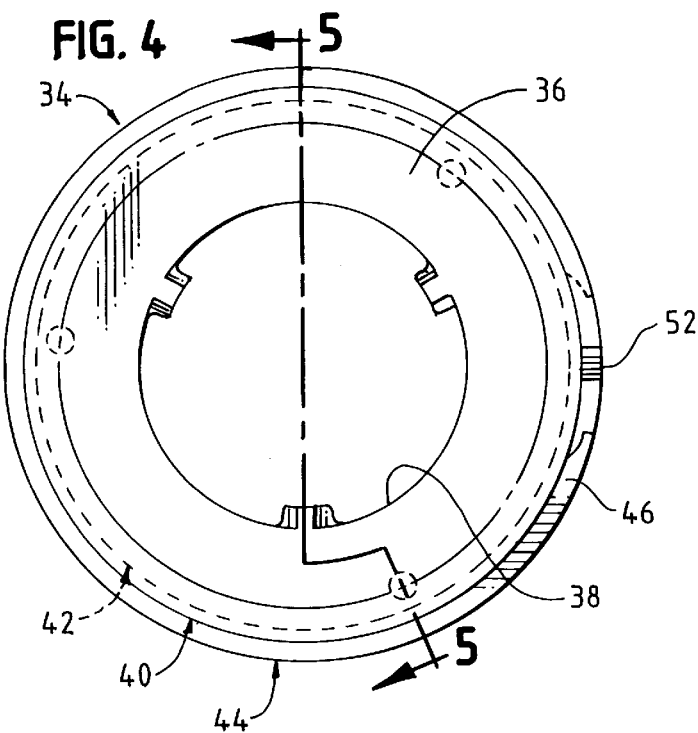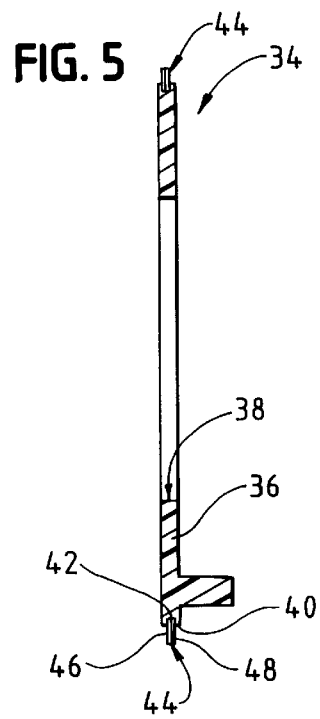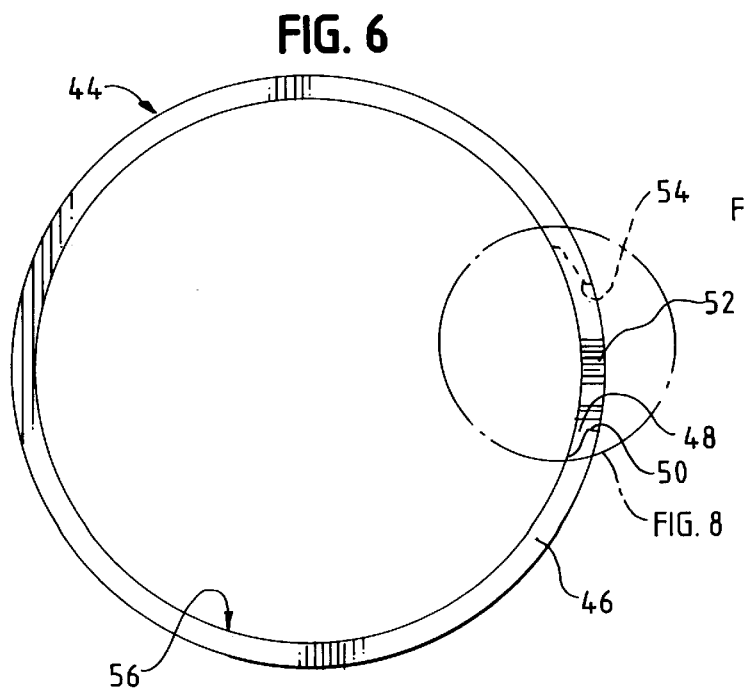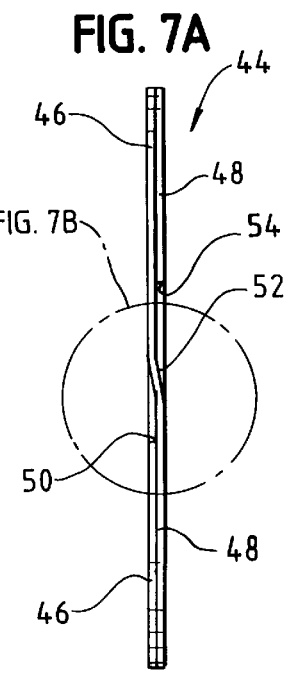

OVERLOAD CLUTCH AND DETECTOR PLATE ASSEMBLY

FIELD OF THE INVENTION

This invention relates to overload clutch devices, and more particularly, to improved detector plates for such overload clutches.

BACKGROUND OF THE INVENTION

Overload clutches are used extensively with automated machinery in single directional drive applications, such as with bottling and canning equipment, amusement rides, and car wash equipment, for example. They are also sometimes used in two-directional applications, such as with manufacturing equipment and parts assembly equipment.

Typically, overload clutches are utilized with a mechanical switch, such as a limit switch, mounted in close proximity to a detector plate carried by the overload clutch. That is, when an equipment jam is noted by the overload clutch, its spring-urged detent means will move, thereby expanding the clutch axially and moving the detector plate into physical engagement with the limit switch (e.g., roller, button or wire-type). Once such movement of the detector plate is sensed by the limit switch, it in turn sends a signal to shut down the drive motor, any reducer, and related equipment. Examples of such overload clutches are typified by the Torq-Guard (Trademark) of Commercial Cam Division of Emerson Electric Co., the assignee of the present invention. Other overload clutches are typied by U.S. Pat. Nos. 3,282,387, 3,546,897, 3,924,421, and 5,067,600, also owned by the assignee of the present invention, but many of these have steel detector plates.

Typically, the detector plates for such overload clutches, particularly for the less-to-moderate expense range type clutches as used in general single directional drive applications, are formed of a high grade engineering type of injection-moldable plastic material. Such plastic detector plates have been satisfactory for use with motion switches. However, more recently, there has been a need to use proximity switches with such overload clutches. Importantly, in use, proximity switches do not have or make physical contact with any detector plate structure. Rather, they sense motion of a metal surface moving towards (or away from) the proximity switch (depending in which condition the switch is set). Accordingly, movement of the typical injection-moldable plastic, i.e., non-metal, detector plate is simply not able to be "seen" by a proximity switch sensing device.

Various attempts have been made to solve this problem. One solution includes forming the detector plate as a solid steel piece; however, that approach is very costly and adds excessive, unneeded inertia forces to the overall overload clutch unit. Another prior art approach to this problem has been to simply rivet or otherwise fasten a metal disk to the injection-molded plastic detector plate. However, due to the high rpm's and significant inertia created (during the high speed stopping and starting of such overload clutches and related machinery), total failures of such riveted detector plates occurred. The detector plate pins were simply sheared off, whereby the detector plate no longer functioned with the clutch unit. Yet another prior attempt to solve this problem was, instead of making the detector plate out of injection-moldable plastic, to form it completely out of machined steel. However, such very heavy steel detector plates created unnecessary inertial problems due to the quick acceleration and deceleration of such overload clutch units.

Thus, there has been an industry need for an inexpensive, low inertia yet sturdy detector plate structure having one or more surfaces that could be "seen" by a proximity switch when the overload clutch caused movement of the detector plate during an overload condition.

SUMMARY OF THE INVENTION

The present invention includes a plastic detector plate having mounted, about its peripheral edge, a metal spiral retaining ring formed of at least one full turn, and preferably of two turns. A peripheral groove cut into the outer edge of the injection molded plastic detector plate accepts, permits seating, and retains the spiral retaining ring. Because the spiral retaining ring is very lightweight, there are no undue weighting or imbalance conditions created by its use. Plus, the overall inertial forces, such as caused by the intermittent high speed starting and stopping of the overload clutch and the associated detector plate and spiral ring, are not significantly different than with simply the prior art type plastic detector plate.

As an alternate embodiment, the injection-molded plastic detector plate is coated, such as by plating, with a suitable metallic surface finish, and no extra spiral retaining ring is used. Such a thin metallic coating allows the associated proximity switch to "see" any motion of the coated detector plate, when the overload clutch detects an overload condition.

BRIEF DESCRIPTION OF THE DRAWINGS

The means by which the foregoing and other aspects of the present invention are accomplished and the manner of their accomplishment will be readily understood from the following specification upon reference to the accompanying drawings, in which:

FIG. 1 is a perspective view of the improved overload clutch of the present invention;

FIG. 2 is a front elevation view of the overload clutch of FIG. 1;

FIG. 3 is a section view of the present overload clutch, taken along lines 3—3 of FIG. 2, and showing the detector plate structure in different operating positions;

FIG. 4 is an elevation view of the detector plate structure of the overload clutch of FIG. 1;

FIG. 5 is a sectional view of the detector plate structure taken at lines 5—5 of FIG. 4;

FIG. 6 is a plan view of the spiral retaining ring structure of the improved detector plate of FIG. 4;

FIG. 7A is a side view of the ring structures of FIG. 6, viewed at the location of arrow A in FIG. 6, and showing certain ring end structure;

DESCRIPTION OF THE PREFERRED EMBODIMENT

Figure 8:
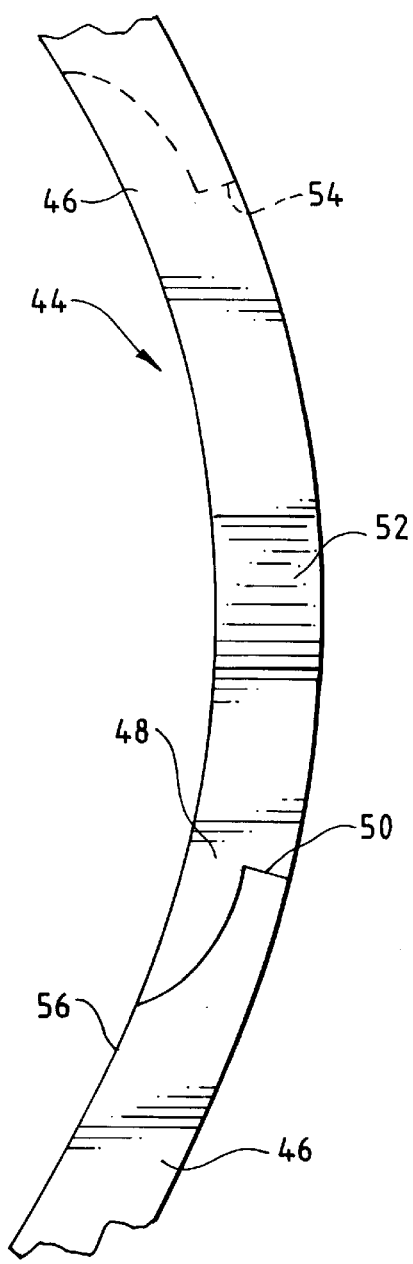
FIG. 8 is an enlarged plan view of the ring end structure of the retaining ring of FIG. 7B.

Having reference to the drawings, wherein like reference numerals indicate corresponding elements, there is shown in FIG. 1 an illustration of an improved overload clutch device of the present invention, as generally denoted by reference numeral 20. The overload clutch 20 is mounted to an input shaft 22 as driven by a motor and reducer (neither shown). The output of the clutch 20, such as the output drive hub 30, is typically mounted to a driven machine, such as an indexer or of assembly machinery, or to a so-called "Ever-Flex" (Trademark) coupling (none shown). The overload clutch 20 includes a housing body 26 which has a mounting plate 29 mounted to it by fasteners 28. A cover 32 is also fastened to the body 26, while the drive hub 30 operates within clutch body 26 in a well-known fashion. A detector plate 34 is carried by the cover 32.

When used in typical drive applications, the drive hub end 30 might have fastened to it (via fasteners in fastening holes 31) such mounting devices as a chain sprocket, a gear, a timing belt pulley, or a flexible coupling (such as a so-called Ever-Flex coupling (Trademark) (none being shown).

As best seen in FIGS. 4 and 5, the detector plate 34 comprises a non-metal flat disk member 36 having a central opening 38. Formed into the outer peripheral edge 40 of disk member 36 is an annular retaining channel or groove 42, which is preferably formed as a continuous groove. In the preferred embodiment, the plastic detector plate 34 is formed of an appropriate engineering grade, injection-moldable plastic material, such as MINON 11C40NCO10, as made by DuPont (Trademark), or VYDYNE R220, as made by Monsanto (Trademark).

As also seen in FIGS. 4 and 5, a flat spiral retaining ring 44, formed with at least one full turn, is retained within annular channel 42. Since ring 44 is formed as an external-type flat spiral retaining ring, the self-biasing inwardly directed spring forces of ring 44 help to retain it within channel 42. The metal retaining ring 44 is commercially available from various sources, such as the SPIROLOX (Trademark) retaining rings made by Kaydon Ring and Seal, Inc., and those similar flat spiral retaining rings as made by Smalley Steel Ring Co. In the preferred embodiment, the spiral retaining ring 44 is formed of SAE 1070-1090 carbon steel. When formed, the retaining ring 44 is always preferably sized and with proper specifications so as to operate well below its maximum rpm limits, i.e., so as to remain retained under its own biasing forces within the annular groove 42 of detector plate 34. Thus, even as the improved overload clutch 20 of the present invention is operated through various quick acceleration and quick deceleration movements in normal use, the metal retaining ring 44 stays mounted to detector plate 34.

Figure 7B:
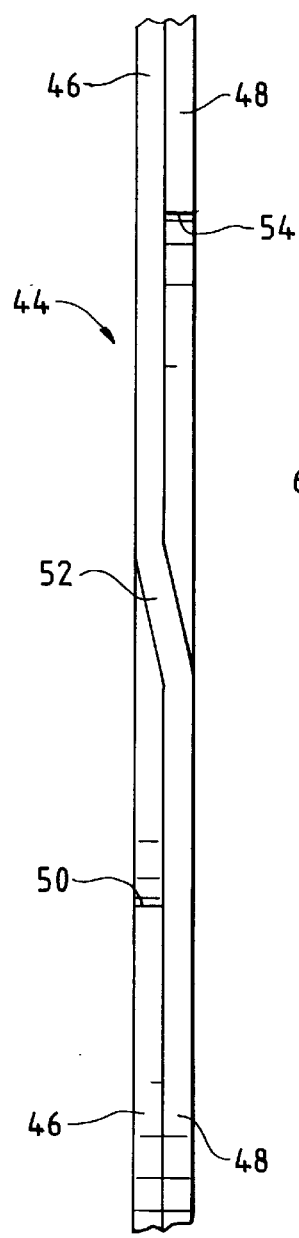
FIG. 7B is an enlarged side view, similar to FIG. 7A, depicting the ring end structure.
Figure 9:
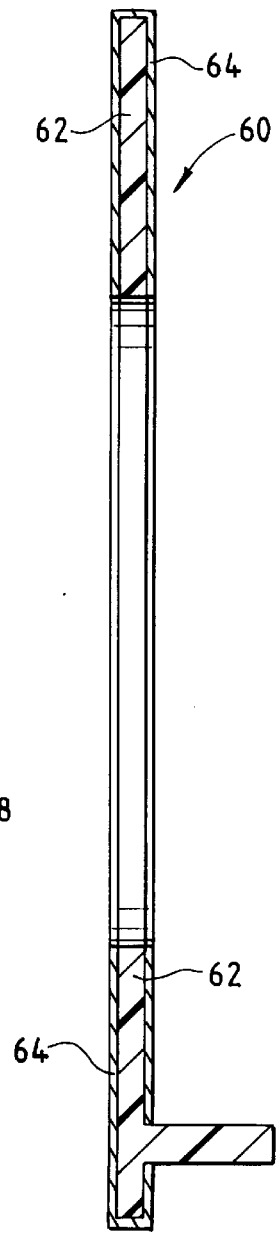
FIG. 9 is a cross section of an alternate embodiment of the detector plate structure depicting a metal coating layer.

As best seen in FIGS. 8 and 9, the flat spiral retaining ring 44 is preferably formed of two turns (actually just short of two full turns). The ring 44 has an upper turn segment 46 and a lower turn segment 48. More specifically, when formed, the spiral retaining ring 44 commences with upper end 50. Then, the first or upper turn segment 46 is formed from end 50 for approximately 340° of a spiral, then passes through a crossover bend, as generally denoted by reference numeral 52 (see FIGS. 6–8), and then continues with a lower turn segment 48 for approximately another 340°, then terminating in the lower end 54.

It will be appreciated that the flat spiral retaining ring 44 is formed as an external type ring. In this manner, the inherent inwardly-directed spring biasing forces tend to reduce the ring's internal diameter so that inner peripheral ring edge 56 will stay seated within and stay retained against the annular groove 42 formed on plastic detector plate 34. However, if so desired for some reason unique to a particular application, the spiral retaining ring could be formed as an internal type ring. In that case, it would have to be retained within a retaining groove formed on the internal diameter periphery of the central opening 38 of detector plate 34. Alternatively, if similarly required due to some particular installation application, the detector plate 34 could be formed with an additional, axially-extending annular circular boss member, i.e., as having a diameter less than that of outer peripheral edge 40. Then, rather than having the external-type spiral retaining ring 44 be biasedly-retained within annular groove 42 at the outer peripheral edge 40, the ring 44 could instead be retained on a similar external groove formed in that axially-extending boss member. However, with that particular alternate arrangement, any associated proximity switch could only be, for its maximum efficiency, aligned in a position axially of the overload clutch unit 20, i.e., not perpendicularly to the detector plate's axis.

In the preferred embodiment, see FIG. 3, the proximity switch, as generally denoted by reference numeral 58, is mounted parallel to the axis of rotation of the overload clutch 20. In this manner, switch 58 is positioned adjacent the outer peripheral edge 40 of detector plate 34, and thus adjacent the spiral retaining ring 44 carried thereby, so as to sense axial movement, i.e., right-to-left movement (in FIG. 3) of metal spiral retaining ring 44.

In a normal operating condition, the detector plate 34 and metal retaining ring 44 are positioned in their solid line position nearest to the cover 32 of overload clutch 20. However, when an overload condition is sensed by overload clutch 20, it operates in a known way to axially extend the detector plate 34 and metal retaining ring 44 to their leftmost (i.e., phantom) position as shown in FIG. 3. When such an axial movement of plate 34 and ring occurs (i.e., to the left in FIG. 3), then the proximity switch 58 is able to "see" or detect the movement of the metal spiral retaining ring 44. Switch 58 then sends a signal to the associated drive components (e.g., the associated drive motor and reducer) to shut off the power and stop further movement, i.e., rotational operation, of the associated equipment. Then, as is customary, upon removal of the jam or other blockage as is causing the overload condition, the overload clutch 20 is rotated until it returns to the engaged or "drive" condition in a well-known fashion, whereby the detector plate 34 and spiral retaining ring 44 are returned to their solid line normal operating position (of FIG. 3). One known brand of detector proximity switch is TURCKS (Trademark).

It will be understood that the more conventional limit switch-type sensing device (not shown) can still be used with the detector plate 34, even though the latter carries the metal spiral ring 44, just as a plastic detector plate could have been used with a limit switch without addition of the spiral retaining ring 44. Thus, the present plate 34 with metal ring 44 can still be physically contacted by the motion sensing wire, or roller button of a conventional limit switch.

Thus, it will be seen that, through the improved detector plate structure of the present invention, proximity switches, as now being preferred in use over conventional limit switches, can still "read" any movement of a non-metal detector plate 34 of an overload clutch 20 by actually reading motion of the metal spiral retaining ring 44, which is carried by the detector plate 34.

Also, as an alternate mounting position for the proximity switch 58, especially when the space is limited, switch 58 can be mounted perpendicular to the axis of detector plate 34, such as shown in phantom in FIG. 3. Nevertheless, left-to-right movement of plate 34 and metal ring 44 (in FIG. 3) is still able to be sensed by the repositioned switch 58, and the overload condition is still properly handled.

It will thus be seen that, by having the metal spiral retaining ring 44 mounted at the outer peripheral edge 40 of the detector plate 34, this allows mounting of the proximity switch 58 in either its axial orientation (as shown in solid line in FIG. 3), or in a perpendicular orientation (as shown in phantom in FIG. 3).

Further, because a lightweight injection-molded plastic detector plate 34 can still be used, with only the addition of the very lightweight spiral retaining ring 44 (e.g., weighing only approximately 2.58 oz. or 73 grams for a 189.0 millimeter diameter ring 44, such as present in a Torq-Gard [Trademark] TG 200 overload clutch made by the assignee of the present invention), the overall detector plate assembly still is easy to remain balanced. That is, since overload clutches, and hence the detector plates, operate at very high rpm's, the present invention does not cause such detector plates to be placed out of balance. Further, the minimal extra weight in the metal spiral retaining ring 44 does not create any problems due to increased inertia. Those were a problem with the all metal detector plates or with heavy metal face disks that were added, i.e., fastened onto, plastic detector plates, such as done in the prior art. It is to be noted that such overload clutch units 20 are normally capable of operating in the rotational speed range of from 0 to 680 rpms, and even higher for other such clutches. However, no vibration problems have been noted as created by such improved detector plates 34 having metal spiral retaining rings 44. Further, yet no speed limitations for the overload clutch 20 are caused by the presence of the metal retaining rings 44, as the same operate on such detector plates well within the maximum rpm limits for such rings 44. Also, the use of the presently-disclosed combination of a metal spiral retaining ring 44 on an injection-molded plastic detector plate 34 can be used on any design or type of overload clutch. It is also believed that the present invention can be used with any size of overload clutch, regardless of its given torque capacity or dimension.

An alternate embodiment of a detector plate is shown in FIG. 9, as generally denoted by reference numeral 60. Detector plate 60 is of a similar design as detector plate 34 of the preferred embodiment, but besides the non-metal (and preferably injection-molded plastic) plate component 62, it also has a plated metal coating 64 thereover. No metal spiral retaining ring is used in this alternate embodiment. In this fashion, the alternate detector plate 60 is still lightweight, does not create any undue imbalance forces, and is not overly large, yet also has a metal motion detection surface, i.e., plated metal coating 64, which when moved with motion of the detector plate 60, causes any adjacent proximity switch 58 to detect notion, and then shut down associated drive motor equipment (not shown). Alternate detector plate 60 otherwise operates and mounts to the overload clutch 20 in the same fashion as detector plate 34.

From the foregoing, it is believed that those skilled in the art will readily appreciate the unique features and advantages of the present invention over previous types of overload clutches and detector plates therefor. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. In an overload-type clutch comprising a clutch body, a clutch output hub, a spring-biased release member between the clutch body and hub, a non-metal detector plate carried by the clutch output hub and operable therewith to move axially of the clutch body when an overload condition is detected by the overload clutch, the overload clutch being for use with a proximity switch device to detect movement of metal components adjacent thereto, the improvement comprising:

a metal snap ring member retained on the non-metal detector plate, whereby movement of said non-metal detector plate also causes movement of said metal snap ring member thereby providing movement of a metal surface to be detected by the associated proximity switch detector device.

2. The invention of claim 1, and a retainer groove formed on the non-metal detector plate, and said snap ring member retained in said retainer groove.

3. The invention of claim 2, wherein said retainer groove is an annular groove formed in the outer periphery of the non-metal detector plate.

4. The invention of claim 2, wherein said retainer groove is a continuous groove.

5. The invention of claim 1, wherein said metal snap ring member is a spiral retaining ring.

6. The invention of claim 5, wherein said metal snap ring is a flat spiral retaining ring.

7. The invention of claim 3, wherein said metal snap ring is an external type spiral retaining ring.

8. The invention of claim 1, wherein said metal snap ring comprises at least one annular turn.

9. The invention of claim 8, wherein said metal snap ring comprises substantially two full turns.

10. The invention of claim 7, wherein the outer diameter of said outer peripheral retainer groove is larger than the inner diameter of said external type spiral retaining ring.

11. An improved non-metal detector plate for use with a proximity switch device associated with an overload-type clutch, the improvement comprising an applied metal coating for the non-metal detector plate, whereby motion of the non-metal detector plate is sensed by the proximity switch device's detection of motion of said applied metal coating.

12. The invention of claim 11, wherein said applied metal coating is a metal coating plated on said non-metal detector plate.

13. The invention of claim 11, wherein said applied metal coating is of substantially uniform thickness on said non-metal detector plate.

* * * * *